United States Patent
Mor et al.

(10) Patent No.: US 7,222,333 B1
(45) Date of Patent: May 22, 2007

(54) TECHNIQUES FOR GENERATING SOFTWARE APPLICATION BUILD SCRIPTS BASED ON TAGS IN COMMENTS

(75) Inventors: Yishay Mor, Zichron Ya'akov (IL); Gadi Berman, Tel Aviv (IL)

(73) Assignee: Cisco Technology, Inc., San Jose, CA (US)

( * ) Notice: Subject to any disclaimer, the term of this patent is extended or adjusted under 35 U.S.C. 154(b) by 788 days.

(21) Appl. No.: 09/978,966

(22) Filed: Oct. 15, 2001

(51) Int. Cl.
G06F 9/44 (2006.01)
G06F 15/00 (2006.01)
G06F 15/16 (2006.01)

(52) U.S. Cl. .................. 717/115; 717/106; 717/114; 717/118; 715/500; 715/513; 709/201

(58) Field of Classification Search ............... 717/116, 717/114–115, 106, 108, 165, 168–178, 120–122, 717/118; 715/500, 513; 719/321, 327; 713/1, 713/2, 100; 710/1, 3, 8–10, 36, 48, 268
See application file for complete search history.

(56) References Cited

U.S. PATENT DOCUMENTS

| | | |
|---|---|---|
| 5,953,526 A | 9/1999 | Day et al. |
| 6,480,865 B1 | 11/2002 | Lee et al. |
| 6,574,655 B1 | 6/2003 | Libert et al. |
| 6,594,823 B1 | 7/2003 | Corbin et al. |
| 6,675,370 B1 | 1/2004 | Sundaresan |
| 6,754,884 B1 | 6/2004 | Lucas et al. |
| 6,810,429 B1 | 10/2004 | Walsh et al. |
| 2001/0054172 A1 | 12/2001 | Tuatini |
| 2002/0029231 A1* | 3/2002 | Aplus et al. ............... 707/513 |

OTHER PUBLICATIONS

Jeremy Roschelle, Doclet your servlet, Mar. 2001, JavaWorld.com.*
Javadoc—The Java API Documentation Generator, Aug. 2000, htp://java.sun.com/j2se/1.3/docs/tooldocs/win32/javadoc.html.*
Kevin Henry, Using the java Document Generator, Aug. 2000, https://secure.acm.org/crossroads/columns/ovp/august2000.html.*
Michael Cymerman, Automate your build process using Java and Ant, Oct. 2000, Javaworld, http://www.javaworld.com/javaworld/jw-10-2000/jw-1020-ant_p.html.*
Jeremy Roschelle, Doclet your servlet!, Mar. 2001, Javaworld, http://www.javaworld.com/javaworld/jw-03-2001/jw-0302-doclets_p.html.*
Anonymous, "An Introduction to the UNIX Make Utility," Middle Tennesee State University, printed Jan. 10, 2002, 8 pages.

(Continued)

Primary Examiner—Antony Nguyen-Ba
(74) Attorney, Agent, or Firm—Hickman Palermo Truong & Becker LLP (57) ABSTRACT

Techniques for forming an application from a particular file that has source code in a particular language include receiving, from the particular file, comment data. The comment data is ignored according to the particular language. The comment data includes build data indicating how to use the source code in a build process. The build process packages compiled code to form the application. Based on the build data in the comment data, build-input data is generated. The build-input data indicates input for the build process. These techniques automatically provide, for the application build process, build information known to the application developer who produced the source code.

30 Claims, 5 Drawing Sheets

OTHER PUBLICATIONS

D. Morse et al., "UNIX man pages: make()," Aug. 22, 1989, 4 pages.
Apache Software Foundation, "The Jakarta Site—Ant," 2000, 12 pages.
Sun Microsystems, "Javadoc Tool Home Page," printed Jan. 10, 2002, 4 pages.
Sun Microsystems, "How to Write Doc Comments to the Javadoc Tool," printed Jan. 10, 2002, 23 pages.
Sun Microsystems, "The Java Language Specification," Chap. 18—"Documentation Comments," 1st ed. 1996, 21 pages.
Anonymous, "XDoclet", http://xdoclet.sourceforge.net/introduction.html, pp. 1-2, printed Feb. 15, 2002.
Anonymous, "Software Configuration", http://xdoclet.sourceforge.net/using.html, pp. 1-4, printed Feb. 15, 2002.
Anonymous, "Xdoclet FAQ Home Page", http://www.jguru.com/faq/Xdoclet, pp. 1-3, printed Feb. 15, 2002.
Anonymous, "<ejbdoclet/> Task", http://xdoclet.sourceforge.net/ejbdoclet.html, pp. 1-26. printed Feb. 15, 2002.
Anonymous, "<webdoclet/> Task", http://xdoclet.sourceforge.net/webdoclet.html, pp. 1-15, printed Feb. 15, 2002.
Anonymous, "Advance Feature-Merge Points", http://xdoclet.sourceforge.net/merge.html, pp. 1-2, printed Feb. 15, 2002.
Anonymous, "IDE Integration", http://xdoclet.sourceforge.net/IDE.index.html, 1 page, printed Feb. 15, 2002.
Anonymous, "Architecture", http://xdoclet.sourceforge.net/architecture.html, pp. 1-12, printed Feb. 15, 2002.
Flanagan, David, "Java in a Nutshell," 1997, O'Reilly & Associates, 2nd Edition, pp. 20, 233, 253-254.
Goldfarb et al., "The XML Handbook", 1998, Prentice Hall Inc., p. 13.
Dietrich et al., "A Reusable Graphical User Interface for Manipulating Object-Oriented Databases using Java and XML," Feb. 1, 2001, ACM, pp. 362-366.
Coates, Anthony B., "Making your Code Readable and Maintainable—With XML & XSLT," XML DevCon Europe, 2001, Feb. 2001, PowerPoint presentation, 28 pages.
Kramer, Douglas, "API Documentation from Source Code Comments: A Case Study Javadoc," ACM, 1999, 1-5813-072, pp. 147-153.
Leslie, Donald M., "Using Javadoc and XML to Produce API Reference Documentation," Apache Software, 1999, pp. 104-109.
Moyle, T., "Writing XML-Friendly Java Documentation," SYS-CON Media, Jan. 1, 2000, retrieved from the internet at <http://idi.sys-con.com/read/36320.htm>, retrieved on Nov. 8, 2005, 5 pages.
Priestly, Michael, "Dynamically assembled documentation," ACM, 1999, 1-58113-072, pp. 53-57.
The Apache Software Foundation, "Javadoc Documentation in XML," 1999, 2 pages.

* cited by examiner

TECHNIQUES FOR GENERATING SOFTWARE APPLICATION BUILD SCRIPTS BASED ON TAGS IN COMMENTS

FIELD OF INVENTION

The present invention generally relates to computer software development, including building applications from source code. The invention relates more specifically to techniques for generating software application build scripts based on tags in comments.

BACKGROUND OF THE INVENTION

Software applications execute on computing devices to perform a variety of functions related to processing and presenting information to users. A large application is typically made up of one or more source code modules, each written in a high-level programming language designed to facilitate human understanding of the steps involved in each module. Example high-level programming languages include FORTRAN, Microsoft Visual Basic, C, C++, and Java®. Statements in such languages are combined to write each module. One or more source code modules are stored together in a source code file. The statements are converted to instructions for a processor on a computing device, which instructions are sometimes called machine instructions, by a particular process, such as a compiler. A compiler generates machine instructions based on several statements or an entire module. The machine instructions are peculiar to particular families of processors.

The machine instructions derived from a source code module constitute an object code module. One or more object code modules are stored together in an object code file. Object code modules use relative addresses to refer to locations in memory. An executable code is generated from object code by linking together the object code and converting relative addresses to absolute addresses.

After the source code modules that make up the software application are written in a programming language, the application is built from the source code files. Building involves retrieving the files containing the source code modules and compiling or interpreting them, depending on the language of the source code, to produce object code files. In some circumstances other files that contain data used by the modules are also retrieved. In some circumstances, building also involves storing one or more object files together with any data files needed in one or more packages. In some circumstances, the modules are linked together and stored as an executable in one of the packages. Some systems use dynamic linking, which links object code modules as needed during the course of the processing. In systems using dynamic linking, the executable is not generated during the build process or stored in one of the packages. The packages are then deployed in one or more directories on a computing device, or on one or more computing devices on a network, to be accessed by users of the application.

For example, in the Java language each source code module is a class that defines attributes and methods for objects formed from the class. The Java class is compiled into bytecode that is executed by a Java virtual machine (JVM) process running on a processor. Under some circumstances, a Java application is formed by packaging bytecode of all the Java classes for the application in a Java archive ("jar") file. The jar file may then be downloaded from one computing device on a network to a second computing device on the network. The application may then be executed on the second computing device.

Building and deploying a large application is a tedious task. Dozens of modules in thousands of files spread over dozens of directories may be involved. Some modules are used only in testing and should be included in debug versions but not in release versions of the application. Some modules change with different versions of the application. Some modules are appropriate for interactions with a web server and others for interaction using other network protocols or no network at all. Thus the modules used in a build depend to some extent on the way the application is deployed.

Several tools have been developed to handle tasks involved in building an application. For example, "make" tools are available on several computer devices running the UNIX operating system and derivatives thereof, such as LINUX. Similar make tools are available for other operating systems. A make tool receives, as input, a make file that is manually prepared by a build engineer and includes names and locations of modules and data files, and names and locations of packages, as well as names and locations of compilers, interpreters and linkers. The make tool processes the make file and generates a set of operating system commands to retrieve and compile the modules listed in the input and to package object code files or executable files with data files. However, a disadvantage is that such tools may be configured to operate only with a specific operating environment configuration.

Another disadvantage is that the build data is retrieved from two locations: the source files (e.g., as directed by import or include statements) and the makefiles (e.g., including the jar file that such files belong to). This makes the build data complicated and hard to handle. Still another disadvantage is that the makefiles, operation of the make tool, and overall supervision of the build process is normally carried out by a release engineer or build engineer, whereas the best source of knowledge about the contents of the source code is normally a different individual, such as a development engineer. Thus, there is no central point of comprehensive knowledge about both the source code and the build process.

Recently, a tool called "Ant" has been introduced that allows the build engineer to specify input for the build tool in an extensible markup language (XML) file. The Ant tool processes the XML file and executes necessary commands in the same general manner as Make. "Ant" is written in Java, and therefore runs on a larger variety of operating systems; it is also more expressive than Make, and is extendible. Descriptions of the Ant tool at the time of this writing can be viewed from file index.html on the ant directory on the worldwide web (www) at domain jakarta.apache.org.

In this description, the term "build" tool is used to refer to any tool, including make tools and Ant, which packages compiled code to form an application.

A problem arises in building complex applications that are created by a team of engineers or developers, because the information used for the build tool does not reside in the knowledge of a single person or working group. The choice of package names and the use of individual modules in different deployments of the application are best known to the application developer or development group. However, information about the deployment computer devices and installed tools is best known by a build engineer or build group. For example, the choice of the number and location of packages depends on the components, architecture and operating systems of the deployment computing devices and network. The choice of compilers, interpreters, and linking processes depend on the software tools already installed on the deployment computing devices and network. The expressions for listing modules, files and tools depend on the scripting language or XML input used in the build tool.

One past approach is for the developer to provide the build engineer with source code. The build engineer employs a build tool to construct the packages. If the build engineer does not include all the modules needed, an error occurs during the build or upon execution of the resulting application. Upon occurrence of an error, the build engineer communicates with the developer to formulate some corrective action. The process is repeated until an application is produced without errors.

However, this approach has numerous disadvantages. It is tedious to reiterate the process and test for errors. Even if no errors are found, the application may include extraneous modules that did not cause an error. For example, the packages may include debug routines that are not used in a release version. As another example, the package may include obsolete modules that cause a known fault in some circumstances not apparent to the build engineer and not expressed during routine testing. Furthermore, after several months or years of evolution for the application, the original developer may no longer be employed by the company that provides the application. Thus the original developer may be inaccessible to the build engineer.

Based on the foregoing, there is a clear need for techniques that automatically provide, for the build process, any build information known to the application developer.

SUMMARY OF THE INVENTION

The foregoing needs, and other needs and objects that will become apparent from the following description, are achieved in the present invention, which comprises, in one aspect, a method for forming an application from a particular file that has source code in a particular language. The method includes receiving, from the particular file, comment data. The comment data is ignored according to the particular language. The comment data includes build data indicating how to use the source code in a build process. The build process packages compiled code to form the application. Based on the build data in the comment data, build-input data is generated. The build-input data indicates input for the build process.

According to another aspect of the invention, a method for forming an application from a particular file that has Java language source code includes inserting build-use data into the particular file within comment data. The comment data is ignored according to the Java language. The build-use data includes a tag for an automated Java documentation system, such as JavaDoc. A routine is provided, which is invoked by the automated Java documentation system in response to the tag. Based on the first data, the routine produces script statements for a build process that packages compiled code to form the application. The automated Java documentation system is executed to operate on the particular file. The automated Java documentation system invokes the routine to produce the script statements for the build process. The script statements, included within other input, are sent to the build process that forms the application.

In other aspects, the invention encompasses a computer apparatus and a computer readable medium, including a carrier wave, configured to carry out the foregoing steps.

These techniques automatically provide, for the application build process, build information known to the application developer who produced the source code.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for building an application from source code is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Operational Context

To illustrate building an application from source code, assume that a Java source code module is a Java "bean" to be used during building of a test version of an application composed of multiple Java beans. The application is a server process that provides a service in response to a request from a client process. The server process and the client process may be on different devices in a network. The server process and client process may communicate through a Web server. A Web server communicates with a web client using the hypertext transfer protocol. In the illustrated embodiments, the application is a stand-alone server process operating on the network through a web server. In other embodiments the application is a servlet operating only in response to a web server, or is a web server itself.

Java

In a Java application, as in other object-oriented languages such as C++, components are implemented as objects. An object is a data structure that is a particular instance of a data structure type defined in a class. The objects are said to be instantiated from the class. The class defines the attributes and methods for all the objects in the class. While all objects instantiated from the same class have the same attributes, the values that those objects store for those attributes may vary from object to object. Furthermore, an attribute may be defined to refer to an object of a second class, so that the value this attribute takes is an object of the second class. Classes can inherit some or all of their attributes and methods from other classes which themselves may inherit attributes and methods from other classes. In Java, the classes form a hierarchy and a class can only inherit from classes above them in the hierarchy to avoid cyclic inheritance. In Java several classes are stored together in a package. Each class in the package has a unique name and the names together constitute a namespace.

Java Beans

A bean is a class of objects with at least a minimum set of attributes and methods, including a bean name and a method for listing the attributes (i.e., properties) and attribute values of each object. This method gives the bean class the behavior of introspection. The bean class includes a method for setting a value for an attribute of the object, and a method for getting the value of the attribute. These methods give the bean class the behavior of persistence, and, by providing a standard format for storing and retrieving information, give the bean class the behavior of serialization.

The methods provide the functionality to store and retrieve the attributes and attribute values of instances of the bean class or of instances of classes that inherit from the bean class. The bean class includes a vector of event handling methods. An event is an object generated by a listener process in response to a message from a client process. Different listeners produce different event types. The event received from the listener is the input parameter for the event handler corresponding to the event type. A JavaBeans class is a commercially available, published bean class including methods for providing introspection, persistence and event handling.

The invention is not limited to this embodiment. In other embodiments, a source code in other languages may be used to produce other types of applications.

Structural Overview

Figure 1A:
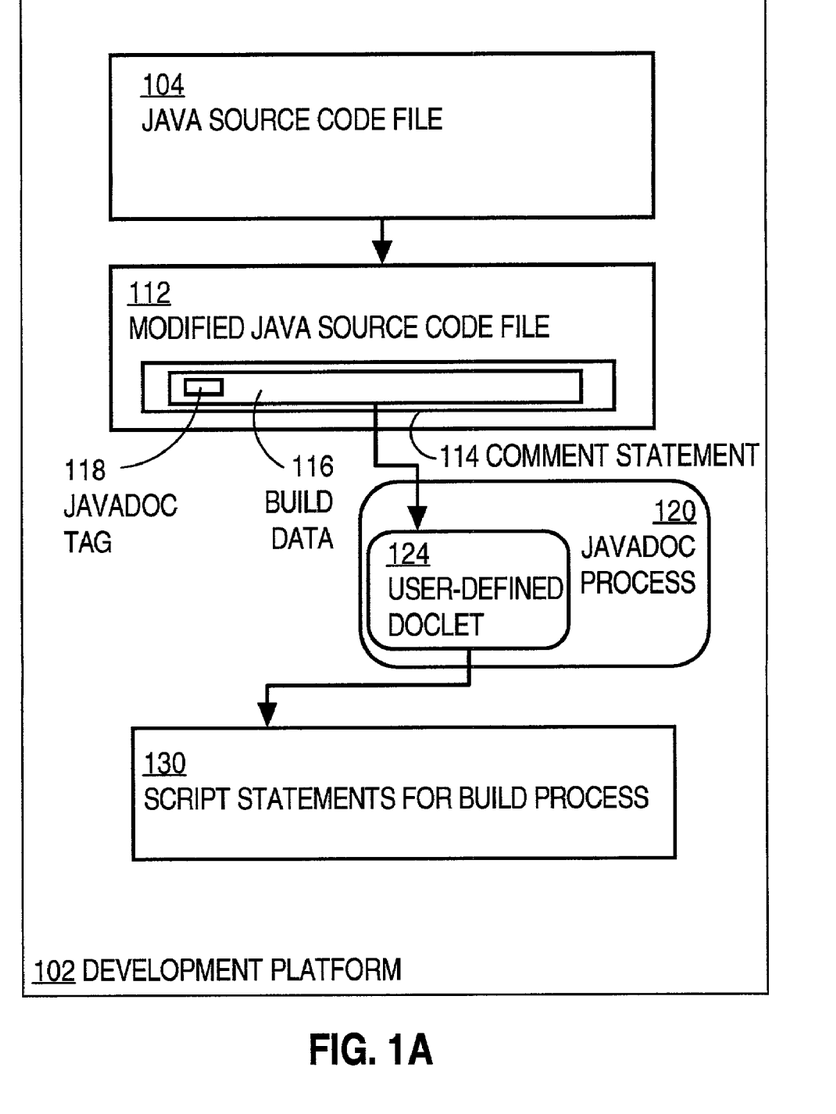
FIG. 1A is a block diagram that illustrates files and processes on a development platform according to an embodiment.

FIG. 1A is a block diagram that illustrates files and processes on a source-code-development platform 102 according to an embodiment. The structural elements of FIG. 1A are introduced in this section. A description of how the structures are used is given in more detail below with reference to FIG. 2 and FIG. 3.

Source Code

Java source code for a Java bean constitutes one module in Java source code file 104. The developer of the source code in file 104 knows things about the source code modules that are relevant to the build process. For example, assume the developer knows the version of the application in which the module is being used, that the developer knows the earliest version of the application for which the module is used, and that the developer knows that one of the modules in the file 104 is used internally for diagnosing defects in the application but can be omitted when the application is released to customers. Assume further that the developer knows that the module uses certain of the JavaBeans classes but not all of them. Other information relevant to the build process is also known by the developer, for example, hints about how the build process should use the module. Such hints may include what version of the JavaBeans server is compatible with this version of the source file (such information is important for compilation), which jar file should eventually include this source file, etc.

According to the illustrated embodiment, the developer generates a modified Java source code file 112 based on the Java source code file 104 by inserting into a comment statement 114 for each module, build data 116 that indicates a hint about how the build process should use the module. A comment statement contains data that is ignored by the compilers and interpreters for the programming language. For example, in Java, as in C and C++, a comment statement extends between a "/*" pair of symbols and the next "*/" pair of symbols. Java compiler and interpreters do not process the data between the /* and */ pairs of symbols.

The build data 116 is inserted into the comment statement associated with a header for a module. In the illustrated embodiment, the build data 116 includes a tag 118 that identifies the build data 116 within the comment statement. In the illustrated embodiment, the tag 118 is a tag used by a JavaDoc process 120. In other embodiments, any tag defined by the developer may be used.

JavaDoc Tool

The JavaDoc process 120 is a tool that uses information in comments statements in source code to generate application programming interface (API) documentation in the hypertext markup language (HTML) format. Web servers and web browsers use the HTML format to exchange information. Descriptions of the JavaDoc tool at the time of this writing can be viewed from file index.html on the javadoc subdirectory of the j2se directory on the worldwide web (www) at domain java.sun.org.

The JavaDoc tool allows users to define classes, called doclets, with methods that are invoked when a tag registered with the JavaDoc tool is encountered in the source code. JavaDoc includes doclets with methods that are invoked for initially registered tags. The JavaDoc tool identifies tags in comments by the "@" symbol followed by a keyword. In one embodiment, the keywords in tags initially registered with the JavaDoc tool include "Company," "author," "version," and "Copyright," among others. "Company" and "Copyright" are non-standard tags that are defined further herein. The JavaDoc tool allows a user to register additional tags with other keywords.

According to the illustrated embodiment, a developer-defined doclet 124 is included in the JavaDoc process 120. The developer-defined doclet 124 includes methods to be invoked for one or more JavaDoc tags, including one or more developer-defined tags. In other embodiments, additional doclets are included in JavaDoc process 120. One or more methods of the developer-defined doclet 124 produces statements 130 for a build process based on the build data 116 in the comment statement 114 for a module in the modified source code file 112. According to the illustrated embodiment, the statements 130 are XML statements for the Ant build tool.

An advantage of using the JavaDoc process is that JavaDoc tags are automatically detected in the source code and the information associated with the tag is automatically passed to the doclet. Therefore programming a doclet is a simpler task than programming a separate process to parse through the source code and find the build data 116. In some embodiments, however, a separate developer-defined process, which is not a doclet of the JavaDoc process, does the parsing, finds the build data 116 in the comment statement 114, and produces the script statements 130 based on the build data 116.

Build Tool

Figure 1B:
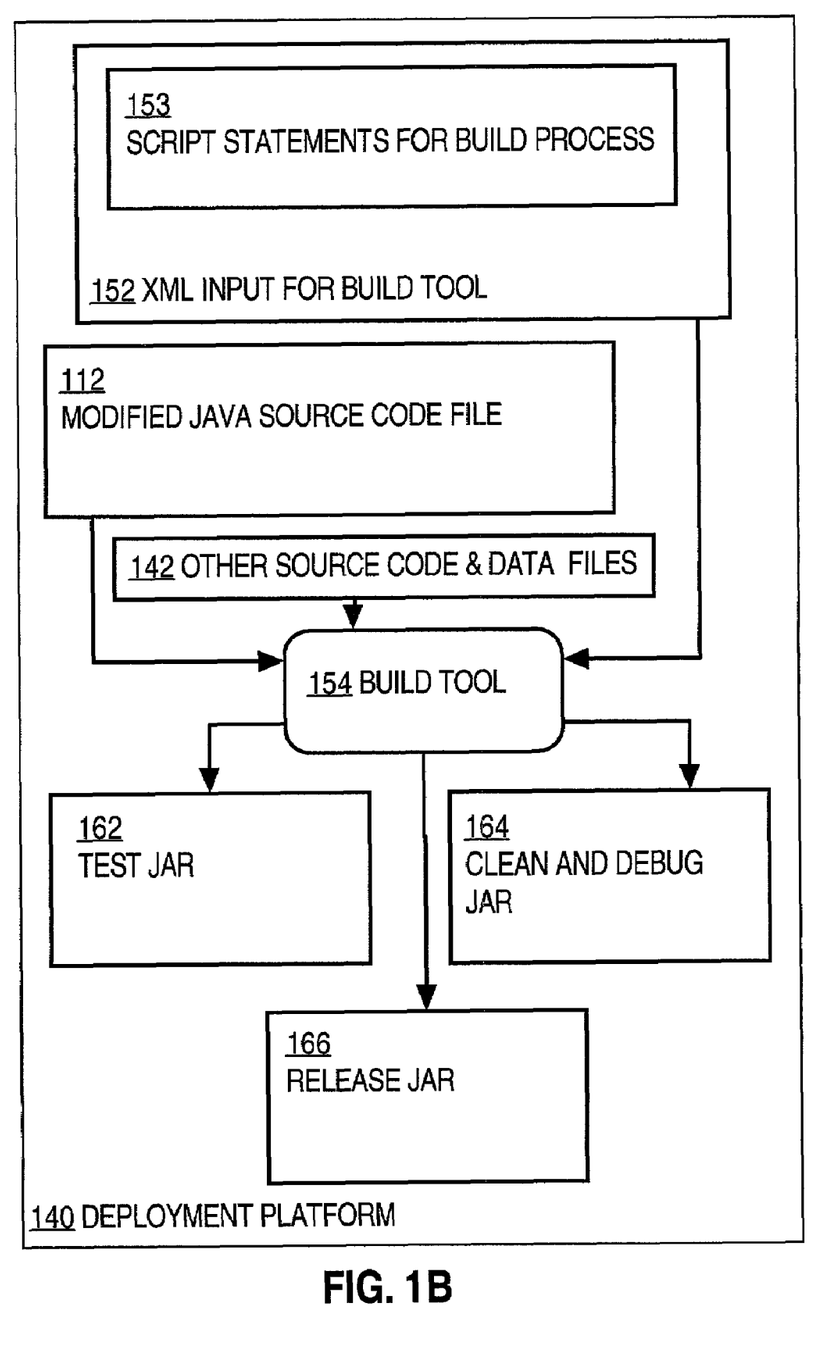
FIG. 1B is a block diagram that illustrates files and processes on a deployment platform according to an embodiment.

FIG. 1B is a block diagram that illustrates files and processes on an application-deployment platform 140 according to an embodiment. The structural elements of FIG. 1B are introduced in this section. A description of how the structures are used is given in more detail below with reference to FIG. 2.

Statements 153 for the build process are included in an XML input file 152. The statements 153 are based on the statements 130 output by the developer-defined doclet shown in FIG. 1A. In some embodiments, the statements 153 are the same as the statements 130. In some embodiments, a build engineer modifies the statements 130 to produce the statements 153. The XML file 152 is sent as input to the build tool 154.

Based on the XML file 152, the build tool retrieves source code files, such as the modified Java source code file 112 depicted in FIG. 1A and other source code files and data files 142, compiles certain of them, and packages them into one or more packages. For example, the build tool 154 produces three jar files 162, 164, 166. Test jar file 162 includes the bytecode classes and data for a developer tool that automatically tests the main application. Debug jar file 164 includes the bytecode classes and data for a debug version of the application, which contains additional information that is used only in the development process, such as verbose error messages. Release jar file 166 includes the bytecode classes and data for a version of the application that is released for use by customers.

Example Source File

For purposes of illustration, assume that a Java source code file named "TestDeviceInventoryManagement.java" includes the Java statements listed in Table 1. This Java source code file includes a class for testing an application that manages an inventory of devices connected to a network.

TABLE 1

Statements in a Java Source Code File
TestDeviceInventoryManagement.java

| Line Number | Java Statement |
| --- | --- |
| 1 | package a.b.c.server.inventory.ejb.test; |
| 2 | import junit.framework.TestCase; |
| 3 | ... |
| 4 | /** |
| 5 | * Junit test class for DeviceInventoryManagement. |
| 6 | * @Copyright Copyright (c) 2001 ABC Corp. |
| 7 | * @Company ABC corp. |
| 8 | * @author T. Writer |
| 9 | * @version 1.0 |
| 10 | */ |
| 11 | public class TestDeviceInventoryManagement extends TestCase { |
| 12 | ... |
| 13 | public TestDeviceInventoryManagement (String name) { |
| 14 | ... |
| 15 | } |
| 16 | public void setUp ( ) { |
| 17 | ... |
| 18 | } |
| 19 | public void testaddDeviceAfterFullDiscovery ( ) { |
| 20 | ... |
| 21 | } |
| 22 | public void testgetDevices ( ) { |
| 23 | ... |
| 24 | } |
| 25 | /** |
| 26 | * @return a suite of tests for getting and adding devices to inventory |
| 27 | */ |
| 28 | public static Test suite ( ) { |
| 29 | ... |
| 30 | } |
| 31 | } |

The statement in line 1 identifies the package to which the classes in this source code file belong, and the subdirectory of the file system where the file resides. For example, the classes in the TestDeviceInventoryManagement.java file belong to the package "a.b.c.server.inventory.ejb.test" and are found in the directory "a.b.c." The import statement in line 2 imports a class from another package; the class imported is named TestCase and the package is named junit.framework. The ellipsis in line 3 indicates other java statements that are not relevant to the illustrated embodiment. For example, the ellipsis in line 3 represents numerous import statements that import classes from other packages or statements that define other classes.

A class is defined with the Java statements beginning at line 11 and ending at line 31. In line 11, the class is named TestDeviceInventoryManagement and extends (e.g., inherits attributes and methods from) the imported class TestCase. The class is designated "public" indicating that it can be invoked by any other class. The ellipsis in line 12 indicates other Java statements, such as those that list the attributes of the class.

Five public methods of the class are indicated by the statements in lines 13 through 29. One method, named TestDeviceInventoryManagement, accepts a parameter having the name "name" that is a string, includes multiple Java statements indicated by line 13 and the ellipsis in line 14, and ends with the bracket in line 15. One method, named setUp, takes no input parameters and returns no objects, as indicated by the term "void" preceding the method name. This method includes multiple Java statements indicated by line 16 and the ellipsis in line 17, and ends with the bracket in line 18.

One method, named testaddDeviceAfterFullDiscover, takes no input parameters and returns no objects, includes multiple Java statements indicated by line 19 and the ellipsis in line 20, and ends with the bracket in line 21. One method, named testgetDevices, takes no input parameters and returns no objects, includes multiple Java statements indicated by line 22 and the ellipsis in line 23, and ends with the bracket in line 24. One method, named suite, takes no input parameters and returns an object of type "Test." This method includes multiple Java statements indicated by line 28 and the ellipsis in line 29, and ends with the bracket in line 30.

A Java comment statement extends from line 4 through line 10 before the class definition statements indicated by lines 11 through 31. The comment includes four JavaDoc tags: the custom tag "@Copyright" in line 6, the custom tag "@Company" in line 7, "@author" in line 8, and "@version" in line 9. Each tag is followed by the data associated with the tag. For example, the Copyright tag in line 6 is followed by copyright information "Copyright (c) 2001 ABC Corp." The data in each line following the JavaDoc tag is used by the JavaDoc process to produce an HTML document that describes an API for the class following the comment statement. Text delimited by "/**" and "*/" is treated as documentation text, and tags receive special treatment depending on the type of tag. For example, the JavaDoc process produces an HTML document listing the class name from line 11 and the version, author, company and copyright information following the respective tags. Because the JavaDoc process includes information from this comment statement into the header of the HTML document describing the class, the comment statement is called the class header comment statement. The JavaDoc process also lists, in the HTML document, the attributes and methods of the class.

JavaDoc also uses a @return tag in a comment preceding a method of the class that returns an object. For example, a comment statement extends from line 25 through line 27 before the "suite" method defined in Java statements indicated by lines 28 through 30. The comment statement in lines 25 through 27 includes the JavaDoc return tag in line 25. The data following the return tag is included in the HTML document produced by the JavaDoc to describe the method named "suite."

Functional Description

Figure 2:
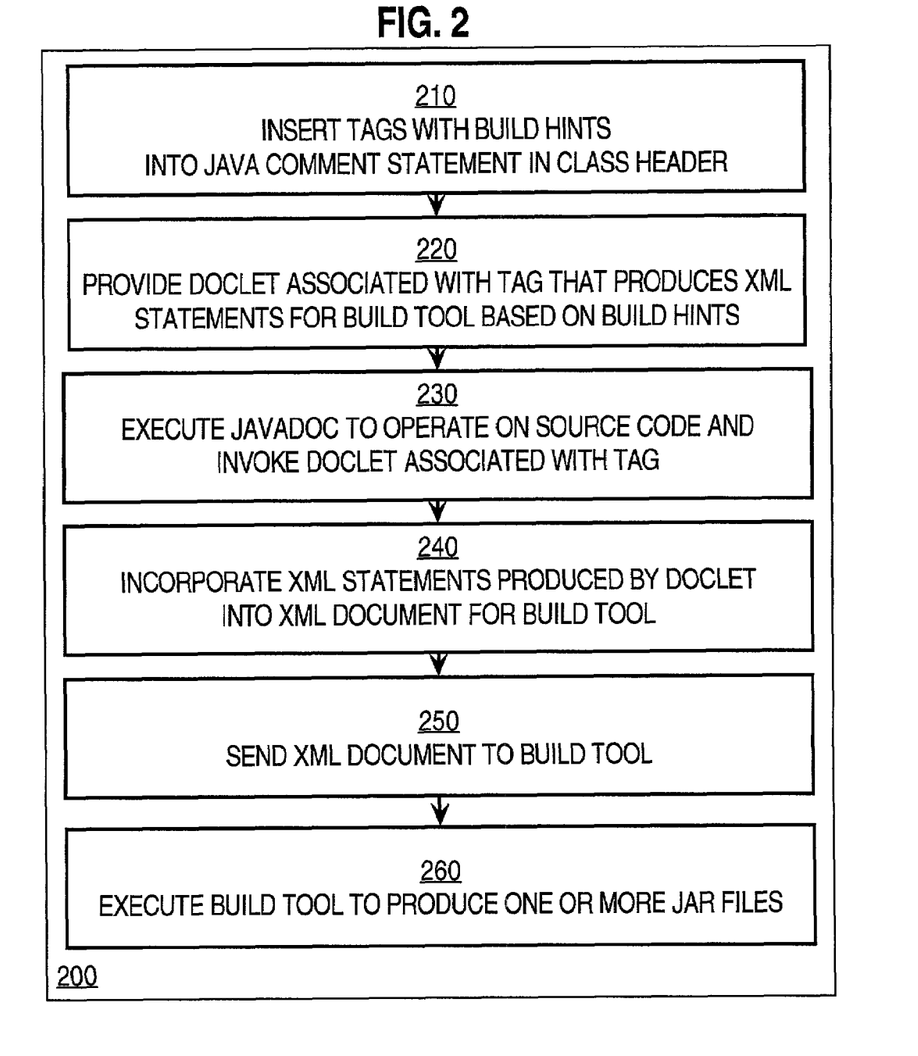
FIG. 2 is a flowchart that illustrates one embodiment of a method for building an application from source code files.

FIG. 2 is a flowchart that illustrates one embodiment of a method 200 for building an application from source code files. Although steps are illustrated in FIG. 2 and following flowcharts in a particular order, the steps may be reordered or occur at overlapping times in other embodiments. The steps of the flowchart in FIG. 2 are illustrated with reference to the example source file in Table 1, described above.

In step 210 tags with build hints are inserted into the class header comment statement of the Java source code file. Some initially registered JavaDoc tags already in the source code file provide build information. For example, the author and version tags can be used by a doclet for generating build statements, as described below. In addition, an initially registered JavaDoc tag "@since" can also be used for build information. The @since tag indicates the first version of the application using the class.

According to the embodiment, developer-defined tags are registered with the JavaDoc process for indicating other build hints. For example, a @jar tag is used to specify a name for a target jar file that should include the class. As another example, a @ddts tag is used to indicate a defect (e.g., a "bug") that the class was formed or changed to solve. In one embodiment, the @ddts tag is followed data indicating a defect identifier (defect ID) used in a defect tracking system. Another example is a @component tag used to indicate that the particular class is part of another named component, or is needed by it, and therefore should be included in any package that includes that component. The @component tag is followed by a list of names of classes that constitute the component. Another example is a @build tag used to distinguish separate build actions. The build tag is followed by data uniquely identifying the build.

Another example is a @prototype tag, which associates a class to a particular design pattern, and describes its role in that pattern. Thus, the @prototype tag may be used to indicate a special functional type, or mode of execution, for the class; in such usage, data following the @prototype tag indicates one of the modes of execution. For example, a design pattern named "WebServer" may appear in a @prototype tag to associate that design pattern with a class that is provided in the tag. In this context, the term "design pattern" has its standard meaning with respect to Java programming, i.e., a standard design concept that can be used to design classes against. The @prototype tag might also designate an execution environment because some patterns are endogenous to a particular environment.

The modes of execution include execution as a servlet indicated by the term "Servlet" following the @prototype tag. A servlet is a java class that is invoked by a Web server in response to a particular request from a Web client. The modes of execution include execution as a test driver for a class, indicated by the term "Test" following the @prototype tag. The term "Test" is followed by a name of a specific class being tested.

Several modes of execution are related to Java Beans, described above. The modes of execution include execution as an Enterprise Java Bean indicated by the term "EJBean" following the @prototype tag. The modes of execution include execution as a home interface for a particular enterprise Java bean indicated by the term "EJBHome" following the @prototype tag. The term "EJBHome" is followed by a name of a specific JavaBean in "< >" brackets. The modes of execution include execution as a remote interface for a particular enterprise Java bean indicated by the term "EJBRemote" following the @prototype tag. The term "EJBRemote" is followed by a name of a specific JavaBean in "< >" brackets.

The modes of execution also include execution of custom tags in a Java Server Page (JSP) by associated tag handlers. The tag handler mode of execution is indicated by the term "tagHandler" followed by the specific tag in a first set of "< >" brackets, and then followed by the name of the tag library to which the tag belongs in a second set of "< >" brackets.

Table 2 shows an example of the modified source code file 112 after inserting tags with build hints into the example of the source code file 104 described by Table 1.

TABLE 2

Statements in a modified Java Source Code File named TestDeviceInventoryManagement.java

| Line Number | Java Statement |
|---|---|
| 1 | package a.b.c.server.inventory.ejb.test; |
| 2 | import junit.framework.TestCase; |
| 3 | ... |
| 4 | /** |
| 5 | * Junit test class for DeviceInventoryManagement. |
| 5.1 | * @prototype Test a.b.c.server.inventory.ejb.DeviceInventoryManagement |
| 5.2 | * @jar diagnostics |
| 5.3 | * @version 0.1 |
| 5.4 | * @build 127 |
| 6 | * @Copyright Copyright (c) 2001 ABC Corp. |
| 7 | *@Company ABC corp. |
| 8 | * @author T. Writer |
| 9 | * @version 1.0 |
| 10 | */ |
| 11 | public class TestDeviceInventoryManagement extends TestCase { |
| 12 | ... |
| 13 | public TestDeviceInventoryManagement (String name) { |
| 14 | ... |
| 15 | } |
| 16 | public void setUp ( ) { |
| 17 | ... |
| 18 | } |
| 19 | public void testaddDeviceAfterFullDiscovery ( ) { |
| 20 | ... |
| 21 | } |
| 22 | public void testgetDevices ( ) { |
| 23 | ... |
| 24 | } |
| 25 | /** |
| 26 | * @return a suite of tests for getting and adding devices to inventory |
| 27 | */ |
| 28 | public static Test suite ( ) { |
| 29 | ... |
| 30 | } |
| 31 | } |

The developer-defined tags inserted into the class header comment statement are shown in lines 5.1 through 5.4. The @prototype tag inserted at line 5.1 provides a build hint that the mode of execution is as a test driver for the DeviceInventoryManagement class of the package named a.b.c.server.inventory.ejb. The @jar tag inserted at line 5.2 provides a build hint that the jar produced by the build process should be named "diagnostics." The @version tag inserted at line 5.3 provides a build hint that the jar produced by the build process is version 0.1 of the diagnostics jar. The @build tag inserted at line 5.4 uniquely identifies a build using the build process as "127." Thus, the value "127" acts as a serial number or sequence number for a particular build. The @build tag may be inserted automatically by the build process rather than by a developer.

In step 220, a doclet is provided to produce XML statements for the build tool based on the build hints in the tags in the modified source code file. For example, a doclet named "cdoc" is provided that locates classes that have a @prototype tag with a value "Test." For each such class found, cdoc generates an XML element that indicates to the build tool to run the test as part of the build process. In an embodiment using the Ant build tool, tests to be run are included between a start XML element '<target name="runTests">' and its end element "</target>." Each test is indicated as a value of a name attribute in an XML "<test>" element. In XML this is indicated by "<test name=" . . . "/>" where the ellipsis is replaced by the test class name. This embodiment is illustrated in more detail below.

Figure 3:
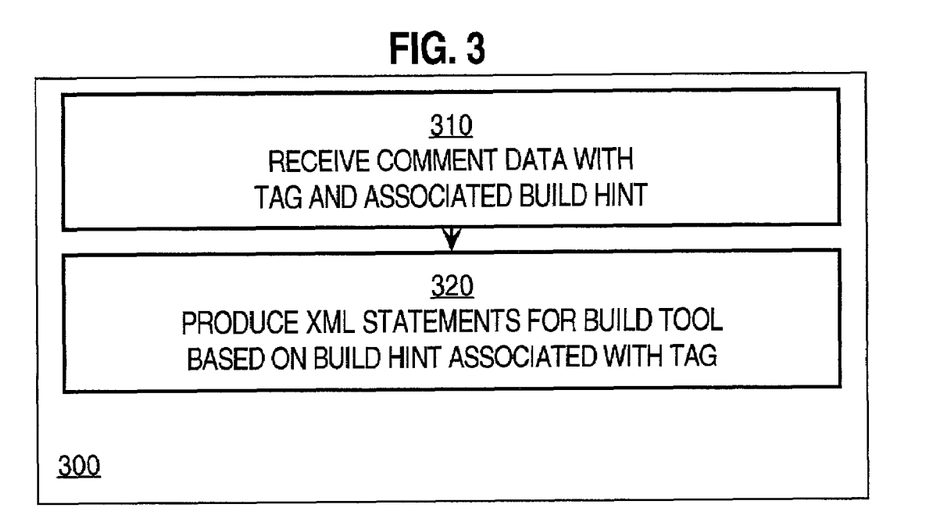
FIG. 3 is a flowchart that illustrates steps performed by a process provided in step 220, according to an embodiment.

FIG. 3 is a flowchart that illustrates steps performed by process 300, such as the doclet provided in step 220, according to an embodiment. In step 310 comment data is received. The comment data includes build data that includes a tag and associated information indicating a build hint. For example, comment data indicated by lines 5 through 10 of Table 2 is received that includes, in line 5.1, the @prototype tag and build hint data "Test" for class DeviceInventoryManagement in package a.b.c.server.inventory.ejb. In a doclet for a JavaDoc process, the JavaDoc process parses the comment statement and places the tag and its associated data in a data structure that is passed to the doclet, as described in more detail below.

In step 320, one or more XML statements for a build tool are produced based on the build hint data associated with the tag in the comment data received in step 310. The XML statements constitute the statements 130 in FIG. 1, according to this embodiment. Step 320 is described in more detail with reference to tables 3 and 4 below.

Table 3 shows some Java statements in an example doclet provided to the JavaDoc process for processing @prototype tags followed by the term "Test."

TABLE 3

Java Statements in an Example Doclet Provided to the JavaDoc Process

Line Number Java Statement

```
 1    import com.sun.javadoc.*;
 2    . . .
 3    public class cdoc {
 4      public static boolean start (RootDoc root) {
 5        . . .
 6        out.println("<target name=\"runTests\">");
 7        . . .
 8        ClassDoc[ ] classes = root.classes( );
 9        for (int i = 0; i < classes.length; ++i) {
10          . . .
11          tags = classes[i].tags("prototype");
12          if(!tags[0].name( ).equalsIgnoreCase("Test")) continue;
13          . . .
14          out.println(" <test name=\"");
15          out.println(classes[i] );
16          out.println("\"/>");
17          . . .
18        }
19        out.println("</target>");
20        out.close( );
21        return true;
22      }
23    }
```

The Java statement in line 1 imports all the public classes from the com.sun.javadoc package from a local network location. Alternatively, the package may be obtained from a JAR file. The ellipsis in line 2 indicates other import statements that are not needed to illustrate this embodiment. The doclet cdoc is defined in the statements indicated by lines 3 through 22. The class cdoc includes a single public method called "start" that returns a boolean object having a value of either true or false. JavaDoc invokes the start method with an object called root of type rootDoc, which includes all the tags for all the classes in a source file. Java statements of the method start that are not needed to understand the embodiment are indicated by ellipses in lines 5, 7, 10, 13 and 17.

In line 6, an XML statement for the build tool is generated on the standard output stream. As described above, the Ant build tool interprets the statement generated by line 6 to indicate the start of a list of tests to perform during the build process. The XML statement generated when the Java statement of line 6 is executed is shown at line 1 in Table 4, below. The pair of symbols, \", is used to indicate that a double quote symbol is to be output. Ordinarily, a double quote symbol is used to delimit text to be output. Step 320 includes processing steps caused by the Java statements that produce the XML statements listed in Table 4.

The Java statement in line 8 of Table 3 invokes a method that puts into each data item of a data structure called "classes" the data for one class parsed by the JavaDoc process from the source code. The data structure classes holds an array of data items containing documentation information associated with JavaDoc tags. An associated doclet identifies each class in the source file that is a test class and places it in the data structure, classes. This feature of JavaDoc greatly simplifies the programming to obtain the tagged data in the comments in the source file as performed during step 310.

The Java statement in line 9 of Table 3 starts a loop through all source files in the code base. The loop ends at the bracket in line 18.

The Java statement in line 11 inserts into the data structure called "tags" data for all the tags with keyword "prototype" in the present class, class[i], during the loop. The tag with keyword "prototype" is a developer-defined JavaDoc tag, as described above. This feature of JavaDoc, which provides all the data associated with a particular tag, also greatly simplifies the programming to obtain the tagged data in comments in the source file, as performed during step 310.

The Java statement in line 12 determines whether the name of the first tag in the data structure is not equal to "Test." If not equal, the loop continues with the next class. If equal, the present class, class[i], is a test class to be executed during the build process. Therefore in the Java statements indicated in lines 14 through 16, XML statements are generated, which statements the build tool will interpret as a test class to be executed. As described above for the Ant build tool, an XML element for a test to be run appears as a value of a name attribute in a <test> element. The XML test element is generated by the Java statements in lines 14 through 16. In line 14 the string shown in Table 4 in line 2 is generated and placed in the output. In line 15, the name of the class is generated and placed in the output, as shown in Table 4 at line 3. The class name includes the package name in which the class is found. In line 16, the end of the test element is generated and placed in the output, as shown in Table 4 at line 4.

The Java statement at line 19 causes the XML statement that indicates the end of the target element to be written to the output, as shown in Table 4 at line 5. The Java statement at line 20 closes the output; and the Java statement at line 21 returns a value of true, indicating the doclet completes its operations successfully.

TABLE 4

XML Statements for a Build Tool produced by the Example Doclet

| Line Number | XML Statement |
|---|---|
| 1 | <target name="runTests"> |
| 2 | <test name= " |
| 3 | a.b.c.server.inventory.ejb.test.TestDeviceInventoryManagement |
| 4 | " /> |
| 5 | </target> |

In step 230, the JavaDoc process, including the doclets provided in step 220, is executed. For example, the JavaDoc process operates on the modified source code listed in Table 2, invokes the doclet, cdoc, described in Table 3, and produces the XML file listed in Table 4. In other embodiments, a separate process outside JavaDoc is used to parse through the source code file and generate the XML statements in Table 4.

In step 240 the XML statements produced in step 230 are incorporated into an XML document 152 for the build tool. For example, the statements for running tests during the build process, depicted in Table 4, are included with other XML statements to form an input file for the build tool. For example, the XML statements of table 4 are incorporated into the XML document described with respect to Table 5. In other embodiments, a build engineer may determine to modify or delete some or all the XML statements produced during step 230.

TABLE 5

XML Statements in input to a Build Tool

| Line Number | XML Statement |
|---|---|
| 1 | XML elements that define the source directories and the target directories |
| 2 | ... |
| 3 | <target name="Clean"> |
| 4 | <delete dir="${classDst}/com"/> |
| 5 | </target> |
| 6 | <target name="Javac"> |
| 7 | ... |
| 8 | </target> |
| 9 | <target name="Jar"> |
| 10 | ... |
| 11 | </target> |
| 12 | <target name="runTests"> |
| 13 | <test name= " |
| 14 | a.b.c.server.inventory.ejb.test.TestDeviceInventoryManagement |
| 15 | " /> |
| 16 | </target> |
| 17 | <target name="Release"> |
| 18 | <property name="debug" value="off"/> |
| 19 | <antcall target="Javac"/> |
| 20 | <antcall target="Jar"/> |
| 21 | </target> |
| 22 | <target name="Test"> |
| 23 | <property name="debug" value="on"/> |
| 24 | <antcall target="Javac"/> |
| 25 | <antcall target="Jar"/> |
| 26 | <antcall target="runTests"/> |
| 27 | </target> |
| 28 | <target name="Clean_and_debug"> |
| 29 | <property name="debug" value="on"/> |
| 30 | <antcall target="Clean"/> |
| 31 | <antcall target="Javac"/> |
| 32 | <antcall target="Jar"/> |
| 33 | <antcall target="runTests"/> |

TABLE 5-continued

XML Statements in input to a Build Tool

| Line Number | XML Statement |
|---|---|
| 34 | </target> |
| 35 | ... |

In Table 5, the XML statements in lines 12 through 16 correspond to the XML statements in Table 4 produced by the example doclet in Table 3 based on the modified source code file in Table 2. The ellipsis in line 35 represents other XML statements in the input file.

Some of the statements in Table 5 are produced by a build engineer. For example, a build engineer defines the directories on the deployment platform where the compiled files and the jar files are placed in statements indicated by line 1 and the ellipses in line 2 in Table 5. As another example, the build engineer defines the Clean process in lines 3 through 5 of Table 5. The clean process deletes all the files in the destination directory for the jar files.

Some of the other statements in Table 5 are produced by other doclets. For example, a doclet may determine to insert XML statements to include and exclude different classes based on the version of the application being built during the compilation steps. The compilation steps are represented in Table 5 by lines 6 through 8. For another example, a doclet may determine to insert XML statements to name a jar file during the jar creation steps. The jar creation steps are represented in Table 5 by lines 9 through 11.

The XML statements for a release version are represented in Table 5 by lines 17 through 21. The XML statement in line 18 indicates to the build tool to set the value of a debug property to off. The XML statement in line 19 indicates to the build tool to compile the code according to the Javac target defined in XML statements represented by lines 6 through 8. The XML statement in line 20 indicates to the build tool to package the application according to the Jar target defined in XML statements represented by lines 6 through 8.

XML statements to invoke Ant to carry out tests on the application are represented in Table 5 by lines 22 through 27. The XML statement in line 23 indicates to the build tool to set the value of a debug property to on. The XML statement in line 24 indicates to the build tool to compile the code according to the Javac target; and the XML statement in line 25 indicates to the build tool to package the application according to the Jar target. The XML statement in line 26 indicates to the build tool to run tests code according to the runTest target defined in XML statements represented by lines 12 through 16.

The XML statements for a Clean_and_debug version are represented in Table 5 by lines 28 through 34. The XML statement in line 29 indicates to the build tool to set the value of the debug property to on. The XML statement in line 30 indicates to the build tool to clean out the destination directory according to the Clean target defined in XML statements represented by lines 3 through 5. The XML statement in line 31 indicates to the build tool to compile the code according to the Javac target; and the XML statement in line 32 indicates to the build tool to package the application according to the Jar target. The XML statement in line 33 indicates to the build tool to run tests code according to the runTest target.

In some embodiments, a doclet or other process provided by the developer determines the XML statements for the Release, Test, and Clean_and_debug version of the application. For example, a doclet may define several compilation targets with different names using different steps, and then use a different compilation target for a release version than for a test version.

Other XML statements not shown in Table 5 may be produced by a process provided by the developer. For example, a doclet may determine to insert XML statements that cause an e-mail to be sent to the author if a build process or test run causes an error.

Referring again to FIG. 2, in step 250 the XML document produced in step 240 is sent to the build tool. In step 260, the build tool is executed and forms the application in one or more packages. For example, the build tool produces three jar files for a network device inventory application, a Release jar file, a Test jar file, and a Debug jar file.

Hardware Overview

Figure 4:
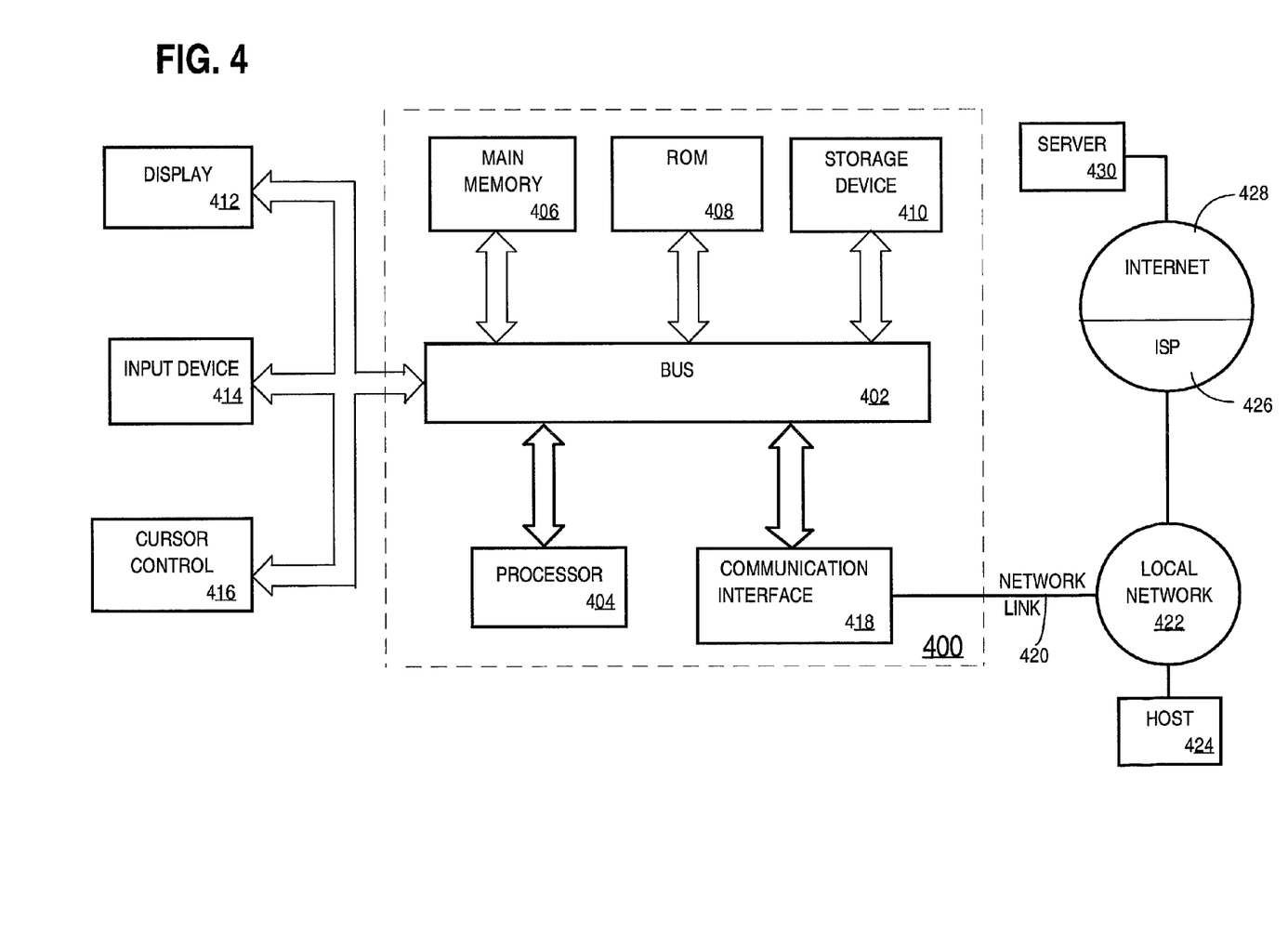
FIG. 4 is a block diagram that illustrates a computer system upon which an embodiment may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory ("RAM") or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory ("ROM") 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube ("CRT"), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for forming an application. According to one embodiment of the invention, an application is formed from source code files by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network ("ISDN") card or a modem to provide a data communication connection to a corresponding type of telephone line. As another example, communication interface 418 may be a local area network ("LAN") card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider ("ISP") 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for a developer-defined doclet as described herein.

The received code may be executed by processor 404 as it is received, and/or stored in storage device 410, or other non-volatile storage for later execution. In this manner, computer system 400 may obtain application code in the form of a carrier wave.

Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of forming a computer program application from a particular file including source code in a particular language, the method comprising the computer-implemented steps of:
   receiving, from the particular file, comment data including first data indicating a build use of the comment data;
   wherein the comment data is ignored by a source code processor of the particular language;
   wherein the build use specifies one or more actions that are to be performed when one or more source code modules are transformed and packaged into machine-executable instructions in an executable code of the computer program application; and
   generating, based on the first data, second data indicating one or more items of input for a build process that packages compiled code to form the computer program application;
   wherein the computer program application when formed comprises executable code; and
   wherein the build process when executed performs the one or more actions specified in the build use.

2. A method as recited in claim 1, wherein:
   the source code comprises one or more classes, each class indicating one or more attributes and behaviors; and
   the comment data is associated with a class header comment of each class in the source code.

3. A method as recited in claim 2, wherein:
   a first class defines a first component of the computer program application; and
   the first data indicates a plurality of classes belonging to the first component.

4. A method as recited in claim 2, wherein the first data indicates a mode of execution for the computer program application, which mode includes use of a first class.

5. A method as recited in claim 4, wherein the mode of execution is execution as a test module.

6. A method as recited in claim 4, wherein the mode of execution is execution as a server providing a service in response to a request.

7. A method as recited in claim 4, wherein the mode of execution is execution within a web server environment.

8. A method as recited in claim 4, wherein:
   the particular language is a language for writing programming code that is compilable into bytecode; and
   the mode of execution is execution as a servlet that is executed by a web server in response to a particular request from a web client.

9. A method as recited in claim 4, wherein:
   the particular language is a language for writing programming code that is compilable into bytecode; and
   the mode of execution is execution as an applet that is sent for execution by a web client in response to a request from the web client.

10. A method as recited in claim 4, wherein:
    the particular language is a language for writing programming code that is compilable into bytecode; and
    the mode of execution is execution as an enterprise bean including a set of published behaviors.

11. A method as recited in claim 4, wherein:
    the particular language is a language for writing programming code that is compilable into bytecode; and
    the mode of execution is execution as a tag handler that is invoked upon receiving a tag in a mark-up language.

12. A method as recited in claim 1, wherein:
    the method further comprises sending the second data to the build process; and
    based on the second data, the build process performs the step of forming the computer program application.

13. A method as recited in claim 12, wherein said step of forming the computer program application includes compiling the source code and generating a package of compiled code on a particular directory based on the second data.

14. A method as recited in claim 13, wherein the compiled code includes compiled code derived from the particular file.

15. A method as recited in claim 1, wherein the first data indicates a name of a particular package into which compiled code based on the source code is packaged by the build process.

16. A method as recited in claim 1, wherein:
    the source code is related to solving a particular defect in a defect tracking system; and
    the first data indicates the particular defect in the defect tracking system.

17. A method as recited in claim 1, wherein:
    the source code is part of a particular version of the computer program application; and
    the first data indicates the particular version of the computer program application.

18. A method as recited in claim 1, wherein:
    the source code is part of a particular version of the application, which particular version precedes a current version of the computer program application; and
    the first data indicates the particular version of the computer program application.

19. A method as recited in claim 1, wherein:
    the source code is written by a developer having a particular identifier; and
    the first data indicates the particular identifier.

20. A method as recited in claim 1, wherein:
    the particular language is a language for writing programming code that is compilable into bytecode; and
    the first data includes a tag for an automated documentation system.

21. A method as recited in claim 20, wherein the tag is defined by a developer of the source code.

22. A method as recited in claim 20, said step of generating the second data based on the first data further comprises:
    providing a routine, invoked by the automated documentation system in response to the tag, to produce script for the build process; and executing the automated documentation system to operate on the particular file.

23. A method of forming an application from a particular file including source code, which source code is written in a particular language and is compilable into bytecode, the method comprising the steps of:
  inserting, into the particular file within comment data ignored according to the particular language, first data indicating a build use of the comment data, the first data including one or more tags for an automated documentation system;
  providing a routine, invoked by the automated documentation system in response to the one or more tags, to produce, based on the first data, script for a build process that packages compiled code to form the application,
  wherein the application, when formed, comprises executable bytecode;
  wherein the build use specifies one or more actions that are to be performed when one or more source code modules are transformed and packaged into machine-executable instructions in the executable bytecode of the application;
  executing the automated documentation system to operate on the particular file and produce the script for the build process; and
  sending the script to the build process to form the application, wherein the build process performs the one or more actions specified in the build use.

24. A machine-implemented method comprising:
  receiving, from a computer program source code file, comment data comprising one or more build action tags,
    wherein the build action tags specify program build actions for a build process to perform to package the computer program source code file into machine-executable code,
    wherein the comment data is ignored by a compiler process;
  automatically generating, based on the tags, a program build script comprising one or more program build statements for input to a build process that packages the machine-executable code,
    wherein the build process when executed performs the program build actions that the build action tags specify.

25. A computer-readable storage medium carrying one or more sequences of instructions for forming a computer program application from a particular file including source code in a particular language, which instructions, when executed by one or more processors, cause:
  receiving, from the particular file, comment data including first data indicating a build use of the comment data;
  wherein the comment data is ignored by a source code processor of the particular language;
  wherein the build use specifies one or more actions that are to be performed when one or more source code modules are transformed and packaged into machine-executable instructions in an executable code of the computer program application; and
  generating, based on the first data, second data indicating one or more items of input for a build process that packages compiled code to form the computer program application;
  wherein the computer program application when formed comprises executable code; and
  wherein the build process when executed performs the one or more actions specified in the build use.

26. The computer-readable storage medium of claim 25, wherein the first data indicates a mode of execution for the computer program application.

27. The computer-readable storage medium of claim 26, wherein the mode of execution is one of:
  execution as a test module;
  execution as a server providing a service in response to a request; and
  execution within a web server environment.

28. The computer-readable storage medium of claim 26, wherein:
  the particular language is a language for writing programming code that is compilable into bytecode; and
  the mode of execution is one of:
    execution as a servlet that is executed by a web server in response to a particular request from a web client;
    execution as an enterprise bean including a set of published behaviors; and
    execution as a tag handler that is invoked upon receiving a tag in a mark-up language.

29. The computer-readable storage medium of claim 25, wherein the first data indicates a name of a particular package into which compiled code based on the source code is packaged by the build process.

30. The computer-readable storage medium of claim 25, wherein:
  the source code is related to solving a particular defect in a defect tracking system; and
  the first data indicates the particular defect in the defect tracking system.

* * * * *